(12) United States Patent
McGregor

(10) Patent No.: US 7,823,692 B2
(45) Date of Patent: Nov. 2, 2010

(54) MUFFLER FOR ENGINES IN OILFIELD APPLICATIONS

(75) Inventor: Howard N. McGregor, Englewood, CO (US)

(73) Assignee: The McGregor Family Limited Partnership, Englewood, CO (US)

( * ) Notice: Subject to any disclaimer, the term of this patent is extended or adjusted under 35 U.S.C. 154(b) by 0 days.

(21) Appl. No.: 12/388,240

(22) Filed: Feb. 18, 2009

(65) Prior Publication Data

US 2010/0206665 A1    Aug. 19, 2010

(51) Int. Cl.
*F01N 1/14* (2006.01)
*F01N 1/08* (2006.01)

(52) U.S. Cl. .................. 181/261; 181/230; 181/264; 181/268; 181/272; 181/403

(58) Field of Classification Search ............. 181/261, 181/268, 272, 230, 264, 403; 166/267; 60/310, 60/775; 96/356
See application file for complete search history.

(56) References Cited

U.S. PATENT DOCUMENTS

| | | | | | |
|---|---|---|---|---|---|
| 2,995,202 | A | * | 8/1961 | Glasgow | 95/242 |
| 3,647,394 | A | | 3/1972 | Wetch et al. | |
| 3,696,590 | A | * | 10/1972 | Richmond | 96/228 |
| 3,853,484 | A | * | 12/1974 | Sudar et al. | 422/113 |
| 3,880,597 | A | * | 4/1975 | Goldschmidt et al. | 422/176 |
| 3,892,276 | A | | 7/1975 | Wells | |
| 4,079,809 | A | * | 3/1978 | Visnapuu et al. | 181/230 |
| 4,139,990 | A | * | 2/1979 | Barnes | 62/5 |
| 4,301,652 | A | * | 11/1981 | Sohda et al. | 60/310 |
| 4,333,754 | A | * | 6/1982 | Peter | 62/5 |
| 4,334,897 | A | * | 6/1982 | Brady et al. | 96/356 |
| 4,463,809 | A | | 8/1984 | Tao | |
| 4,470,772 | A | * | 9/1984 | Gannaway | 417/368 |
| 4,600,474 | A | | 7/1986 | Korenowski | |
| 4,699,719 | A | | 10/1987 | Finley | |
| 4,804,477 | A | | 2/1989 | Allen et al. | |
| 4,877,536 | A | | 10/1989 | Bertness et al. | |
| 4,882,009 | A | * | 11/1989 | Santoleri et al. | 159/4.2 |
| 4,922,937 | A | * | 5/1990 | Bloch | 134/22.12 |
| 4,995,460 | A | * | 2/1991 | Strahan | 166/267 |
| 5,121,602 | A | * | 6/1992 | McCorvey | 60/310 |
| 5,214,937 | A | * | 6/1993 | Henrichs et al. | 62/468 |
| 5,220,137 | A | * | 6/1993 | Howerton et al. | 181/264 |
| 5,292,108 | A | * | 3/1994 | Sutton | 254/323 |
| 5,335,728 | A | * | 8/1994 | Strahan | 166/267 |
| 5,718,298 | A | * | 2/1998 | Rusnak | 175/66 |
| 5,769,058 | A | * | 6/1998 | Scogin | 123/527 |
| 5,832,726 | A | * | 11/1998 | Rees et al. | 60/322 |
| 6,551,385 | B2 | * | 4/2003 | Turner et al. | 95/269 |
| 7,037,105 | B2 | | 5/2006 | Hayes | |

(Continued)

*Primary Examiner*—Elvin G Enad
*Assistant Examiner*—Christina Russell
(74) *Attorney, Agent, or Firm*—Dorr, Carson & Birney, P.C.

(57) ABSTRACT

A muffler for an engine in oilfield applications has a tube with nozzles in its inlet section for spraying a mist of water from the well into the exhaust gases produced by the engine, so that a significant portion of the water is converted to water vapor and exits with the exhaust gases at the outlet of the tube. Vortex generators on the interior surface of the midsection of the tube create turbulence in the exhaust gases and water mist. A sump at the outlet section of the tube collects the remaining water and pollutants trapped by the water for subsequent disposal.

8 Claims, 2 Drawing Sheets

U.S. PATENT DOCUMENTS

| | | |
|---|---|---|
| 7,201,225 B2 | 4/2007 | Smith et al. |
| 2004/0261952 A1 | 12/2004 | Hart et al. |
| 2005/0120715 A1* | 6/2005 | Labrador .................... 60/618 |
| 2006/0137356 A1* | 6/2006 | Jimenez Haertel et al. .... 60/775 |
| 2006/0140791 A1* | 6/2006 | Deming et al. ........... 417/410.3 |
| 2006/0218931 A1* | 10/2006 | Haertel et al. ................. 60/775 |
| 2007/0284178 A1* | 12/2007 | Scanlon ...................... 180/309 |
| 2008/0148722 A1* | 6/2008 | Shirra ......................... 60/324 |
| 2008/0190607 A1 | 8/2008 | Minnich et al. |

* cited by examiner

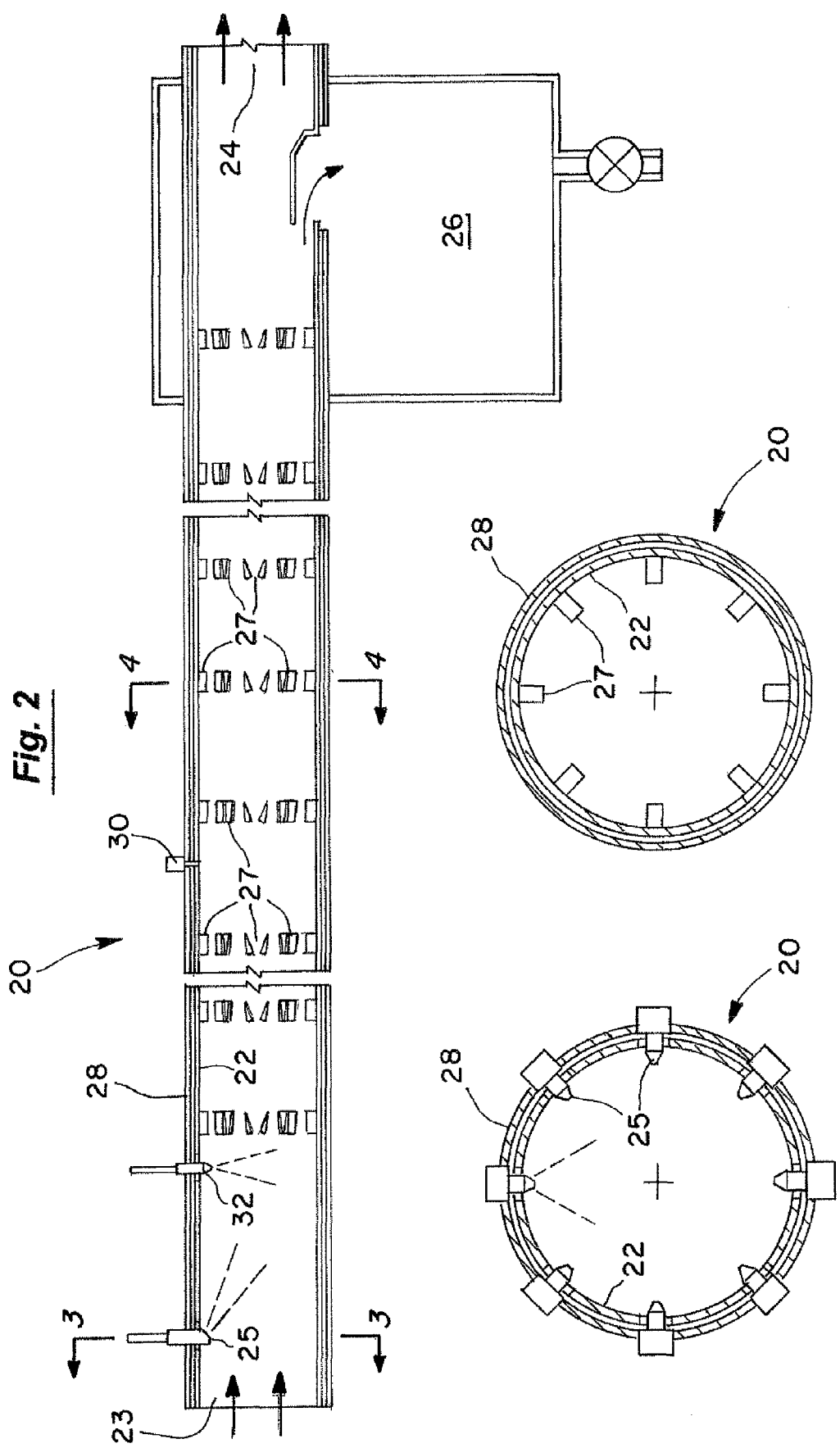

MUFFLER FOR ENGINES IN OILFIELD APPLICATIONS

BACKGROUND OF THE INVENTION

1. Field of the Invention

The present invention relates generally to the field of mufflers for engines in oilfield applications. More specifically, the present invention discloses a muffler for engines in oilfield applications that employs a fine mist of well water to reduce noise, remove pollutants from the exhaust gases, and vaporize a large portion of the well water to reduce the volume of well water to be transported off-site.

2. Statement of the Problem

Many oil and gas wells produce significant quantities of water, as well as oil or gas. In many cases, this water cannot simply be discharged due to its salt content or other pollutants. The conventional approach to this problem has been to haul this well water away by truck for off-site treatment or disposal. The well operator is typically charged based on the volume of well water that must be transported. These fees can be very substantial. Therefore, well operators have a significant interest in reducing the volume of well water to be hauled away.

The prior art in this field includes U.S. Pat. No. 4,804,477 (Allen et al.), U.S. Pat. No. 4,882,009 (Santoleri et al.) and U.S. Pat. No. 7,201,225 (Smith et al.), and U.S. Patent Application Pub. No. 2004/10261952 (Hart et al.) that show examples of evaporators for reducing the volume of well water using heat sources other than the well engine.

A separate, but related problem involves the noise and air pollution produced by engines used to power oil and gas wells. These are typically large, stationary internal combustion engines. Similar engines are also used at compressor stations used for collecting and transporting gas and oil through pipelines to market. Also, engines are used in oilfield applications for driving electrical generators to produce electrical power used by other equipment close to oil and gas wells (e.g., water pumps at an injection well). Although many engines in oilfield applications are located far from human habitation, others are close enough to dwellings or environmentally-sensitive areas to be of concern. In any event, applicable governmental laws or regulations may limit noise and air pollution from such engines. Therefore, a need exists for a muffler to effectively limit noise and air pollution from engines used in oilfield applications.

The prior art in this field includes U.S. Pat. Nos. 4,995,460 and 5,335,728 (Strahan). The Strahan '728 patent discloses a system for evaporating water at gas wells. The Strahan system is powered by heat from a compressor engine, but employs a separate muffler and heating vessel. The Strahan '460 patent is a variation on the system disclosed in the Strahan '728 patent. Hot exhaust gases from the compressor engine pass initially through a pipe running through an evaporator, and then enter a separate muffler. A portion of the exhaust gases from the muffler can be recirculated by a pipe to make a second pass through the evaporator to help vent steam from the evaporator. Here again, the muffler and evaporator are separate.

The prior art also includes a wide range of conventional mufflers for internal combustion engines that reduce noise by means of acoustic baffles or sound-dampening techniques.

Finally, the prior art includes U.S. Pat. No. 4,647,394 (Wetch et al.) and U.S. Pat. No. 3,853,484 (Sudar et al.), which disclose devices for use with combustion engines that combine the functions of a muffler and scrubber. Exhaust gases pass through a venturi which aspirates a reactant material into the exhaust gas stream near the venturi throat.

Solution to the Problem

The present invention addresses the concerns outlined above by providing a device for use with oilfield engines that combines the functions of a muffler, evaporator and scrubber. In particular, the present invention sprays a mist of well water into the stream of engine exhaust. This muffles engine noise, scrubs pollutants from the exhaust gases, and a large portion of the well water is converted to water vapor that exits with the remaining exhaust gases. The remaining water and dissolved pollutants are collected in a sump and can be hauled off-site for disposal.

SUMMARY OF THE INVENTION

This invention provides a muffler for use with an engine in oilfield applications having a tube with nozzles in its inlet section for spraying a mist of water from the well into the exhaust gases produced by the engine, so that a significant portion of the water is converted to water vapor and exits with the exhaust gases at the outlet section of the tube. Vortex generators on the interior surface of the midsection of the tube create turbulence in the exhaust gases and water mist. A sump at the outlet section of the tube collects the remaining water and pollutants trapped by the water for subsequent disposal.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which:

FIG. 2 is a side cross-sectional view of the muffler 20.

FIG. 3 is a cross-sectional view of the inlet section of the muffler 20 showing the nozzles 25.

FIG. 4 is a cross-sectional view of the midsection of the muffler 20 showing the vortex generators 27.

DETAILED DESCRIPTION OF THE INVENTION

Figure 1:
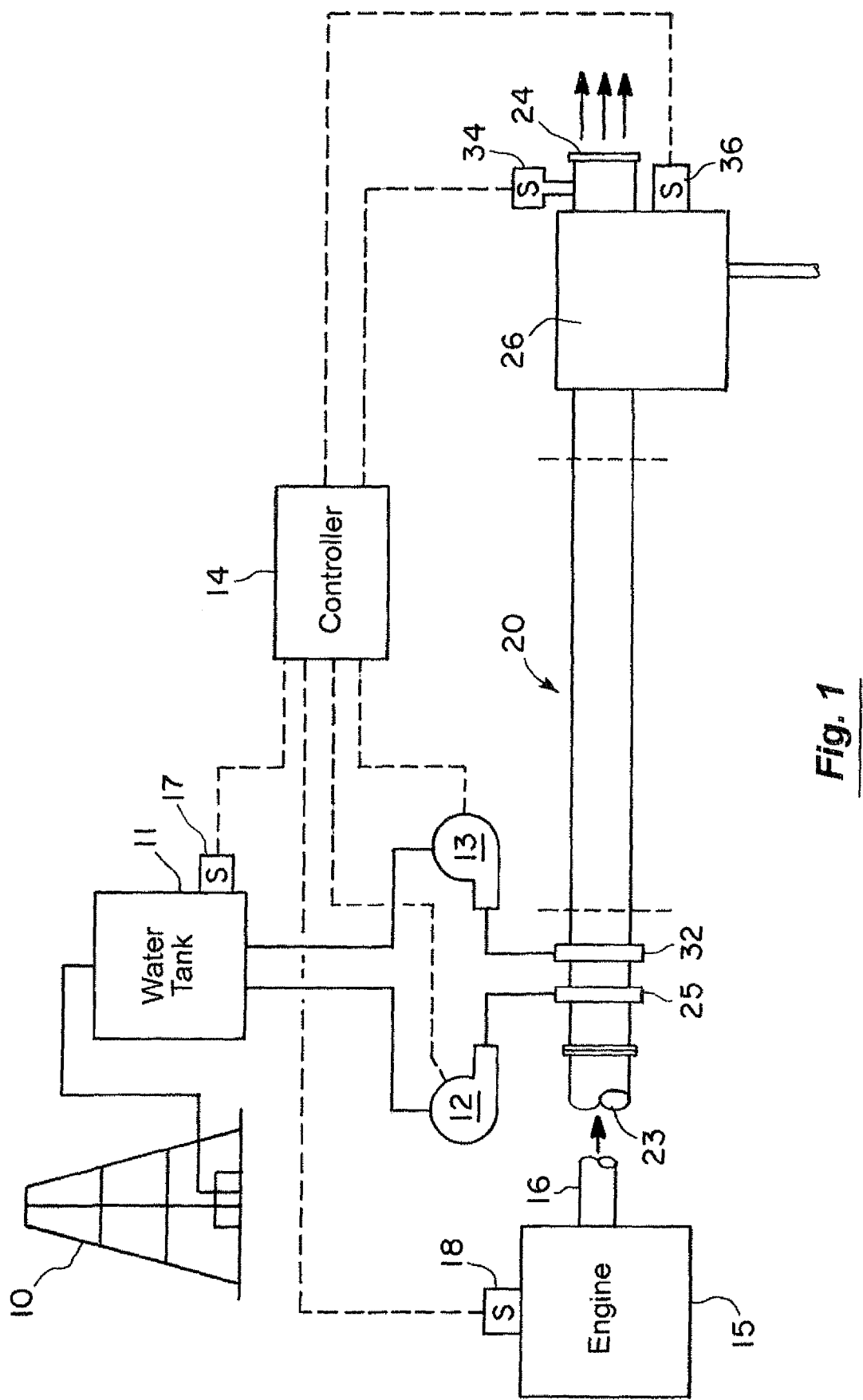
FIG. 1 is a side elevational view of the muffler 20 with the remaining components of the present system and an oil/gas well 10 shown in schematic form.

Turning to FIG. 1, a side elevational view of the present muffler 20 is provided with the remaining components of the present system and an oil/gas well 10 shown in schematic form. As illustrated in FIG. 1, many oil/gas wells 10 also produce water, which is separated from the oil or gas, and then typically stored temporarily in a water tank 11. Internal combustion engines 15 are also commonly used to power oil/gas wells 10, and in association with compressor stations and electrical generators near oil/gas wells, as previously discussed. All of these can be referred to as engines in oilfield applications. For example, such engines can located immediately adjacent to an oil/gas well, or associated in sufficiently close vicinity to an oil/gas well to allow well water to be supplied by pipe or tanker. These engines 15 produce a stream of exhaust gases that exit via an exhaust pipe 16 as shown in FIG. 1.

A corresponding side cross-sectional view of the muffler 20 is shown in FIG. 2. The major components of the muffler 20 are an inner tube 22, a set of nozzles 25 adjacent to the tube inlet 23, a set of vortex generators 27, and a sump 26 adjacent to the tube outlet 24. The inlet 23 of the tube 22 is connected to the exhaust pipe 16 of the engine, so that the exhaust gases pass through the tube 22. The nozzles 25 near in the inlet 23 of the tube 22 spray a mist of well water into the exhaust stream. A pump 12 supplies well water under pressure to the nozzles 25 from the water tank 11. FIG. 3 is a cross-sectional view of the inlet section of the muffler 20 showing the nozzles 25. In the preferred embodiment of the present invention, a very fine mist is produced by the nozzles 25 (e.g., droplet sizes in the micron range). The fine water droplets cool the exhaust gases and also absorb pollutants (e.g., $SO_X$, $NO_X$, iron, manganese, selenium, nitrates, bacteria, slime, many volatile organic compounds and other odor emissions). The resulting change in temperature and density of the engine exhaust gases results in reflection of sound waves and reduction in the sound emissions from the muffler 20. A large portion of the water evaporates and is converted into water vapor. This water vapor exits with the remaining exhaust gases at the outlet 24 of the muffler 20 and is dispersed into the ambient atmosphere.

The interior surface of the midsection of the tube 22 is lined with a number of sets of vortex generators 27, as depicted in FIG. 2. Another cross-sectional view of the tube 22 and vortex generators 27 is depicted in FIG. 4. For example, the vortex generators 27 can be small vanes extending radially inward from the interior surface of the tube 22. These vortex generators 27 produce turbulence in the stream of exhaust gases and water mist to enhance mixing and reduce engine noise. The vortex generators 27 also cause reflection of sound waves in the tube 22 resulting in reduction of sound emitting from the tube 22.

The outlet 24 vents the remaining exhaust gases and water vapor to the ambient atmosphere. The outlet section of the tube 22 includes a sump 26 that collects the remaining water and trapped pollutants for subsequent disposal. Since a large portion of the well water has been converted to water vapor, the volume of the remaining water collected by the sump is greatly reduced. In other words, the amount of mineral-laden water that has to be disposed of is greatly reduced. The tube 22 can be tilted slightly downward toward its outlet 24 so that water droplets deposited along the interior surface of the tube 22 will tend to flow toward the sump 26.

The muffler 20 can also be provided with a number of flushing ports 32 for delivering water to remove deposits from the tube during cleaning and flush the deposits into the sump 26 for disposal. The flushing ports 32 can be located near the inlet section of the tube 22, as shown in FIG. 2, or spaced at intervals along the length of the tube 22. The water used to flush the tube 22 can be delivered by a pump 13 from the well water tank 11 as high-pressure sprays designed to dislodge deposits, or in the form of large flow rates of water under low pressure.

Optionally, the muffler 20 can be equipped with a vibrator 30 for vibrating the tube 22 to dislodge deposits within the tube 22. In the embodiment illustrated in FIG. 2, a shell or housing 28 encloses the tube 22. The vibrator 30 can be an electrically or compressed air driven vibrator or impact unit attached to the shell 28 that loosens deposits on the internal surfaces of the tube 22 and vortex generators 27, thereby allowing the flushing system to wash these deposits from the muffler 20 and into the sump 26.

Operation of the muffler 20 can be automated by including a control system 14 and a suitable array of sensors 17, 18, 34 and 36. As shown in FIG. 1, the controller 14 monitors operation of the engine 15 (e.g., on/off status, engine speed and temperature) via a number of engine sensors 18. An exhaust gas sensor 34 on the muffler 20 allows the controller 14 to monitor emissions in the exhaust gas stream exiting the muffler 20. This data can be used by the controller 14 to determine an optimal flow rate of well water supplied by the pump 12 to the nozzles 25, and to make corresponding adjustments. The controller can also monitor the level and temperature of the water in the sump 26 with sump sensors 36. Other sensors could also be included, such as flow sensors to monitor the actual flow rates to the well water tank 11, nozzles 25 and the flushing ports 32, or from the sump 26. A water level sensor 17 can also be included in the well water tank 11. Temperature and pressure sensors could be included in various sections of the tube 22 for safety and to provide inputs to the controller 14 for regulating the flow of well water to the nozzles 25. Temperature sensors could also be used to warn of freezing conditions in the water tank 11, muffler 20, sump 26 and pipes.

It should be noted that the present invention offers a number of advantages over the prior art in this field. The present system reduces engine emissions, such as carbon dioxide, nitrogen oxides, and sulfur dioxide, in addition to consuming well water and odors. In addition, the use of a fine water mist for enhances absorption of exhaust gas pollutants. Furthermore, the use of a fine water mist in combination with vortex generators is unique for both noise reduction and scrubbing pollutants. The present muffler is fail-safe, in that system shutdown does not necessitate engine shutdown. Finally, the vibrator 30 and flushing ports 32 greatly simplify purging and residue removal, and enhance serviceability.

The above disclosure sets forth a number of embodiments of the present invention described in detail with respect to the accompanying drawings. Those skilled in this art will appreciate that various changes, modifications, other structural arrangements, and other embodiments could be practiced under the teachings of the present invention without departing from the scope of this invention as set forth in the following claims.

I claim:

1. A muffler for an engine producing exhaust gases associated with an oil/gas well that also produces water, said muffler comprising:
   a tube having an inlet for receiving exhaust gases from an engine, an interior surface, and an outlet;
   nozzles within the tube for spraying a mist of water from a well into the exhaust gases to convert a significant portion of the water to water vapor that exits with the exhaust gases at the outlet of the tube;
   vortex generator means on the interior surface of the tube for creating turbulence in the exhaust gases and water mist, and thereby muffling engine noise; and
   a sump collecting the remaining water and pollutants trapped by the water from the tube.

2. The muffler of claim 1 further comprising a vibrator for vibrating the tube to dislodge deposits within the tube.

3. The muffler of claim 1 wherein said vortex generator means are located in a midsection of the tube between the nozzles and the sump.

4. The muffler of claim 1 further comprising flushing ports within the tube for delivering water to remove deposits from the tube.

5. The muffler of claim 1 wherein the nozzles are adjacent to the inlet of the tube.

6. A muffler for an engine producing exhaust gases associated with an oil/gas well that also produces water, said muffler comprising:
   a tube having an interior surface with an inlet section for receiving exhaust gases from an engine, a midsection, and an outlet section;

nozzles into the inlet section of the tube for spraying a mist of water from a well into the exhaust gases to convert a significant portion of the water to water vapor that exits with the exhaust gases at the outlet section of the tube;

vortex generator means on the interior surface of the midsection of the tube for creating turbulence in the exhaust gases and water mist, and thereby muffling engine noise; and a sump at the outlet section of the tube for collecting the remaining water and pollutants trapped by the water.

7. The muffler of claim 6 further comprising a vibrator for vibrating the tube to dislodge deposits within the tube.

8. The muffler of claim 6 further comprising flushing ports within the inlet section of the tube for delivering water to remove deposits from the tube.

\* \* \* \* \*